(12) United States Patent
Svetlik

(10) Patent No.: US 6,502,859 B1
(45) Date of Patent: Jan. 7, 2003

(54) AUTOMOTIVE SAFETY NET SYSTEM

(76) Inventor: Robert W. Svetlik, 822 Terry La., Key West, FL (US) 33040

( * ) Notice: Subject to any disclaimer, the term of this patent is extended or adjusted under 35 U.S.C. 154(b) by 0 days.

(21) Appl. No.: 09/882,717

(22) Filed: Jun. 18, 2001

(51) Int. Cl.[7] .............................................. B60R 21/06
(52) U.S. Cl. ...................... 280/749; 280/748; 296/24.1
(58) Field of Search ................................ 280/748, 749, 280/730.1, 730.2; 296/24.1; 180/274

(56) References Cited

U.S. PATENT DOCUMENTS

| | | | |
|---|---|---|---|
| 1,959,974 A | * 5/1934 | Westgate | 160/DIG. 2 |
| 3,190,687 A | * 6/1965 | Johnson | 280/748 |
| 3,525,535 A | * 8/1970 | Kobori | 280/749 |
| 3,643,972 A | * 2/1972 | Caiati et al. | 280/749 |
| 3,650,542 A | * 3/1972 | Shimano et al. | 280/749 |
| 4,043,582 A | 8/1977 | Lyter | |
| 4,083,561 A | * 4/1978 | Daffer, Jr. | 273/127 C |
| 4,213,636 A | 7/1980 | King | |
| 4,906,020 A | 3/1990 | Haberer | |
| 4,924,814 A | * 5/1990 | Beaudet | 119/96 |
| 5,226,672 A | 7/1993 | Husted | |
| 5,290,086 A | * 3/1994 | Tucker | 280/749 |
| 5,511,842 A | * 4/1996 | Dillon | 296/24.1 |
| 5,529,341 A | * 6/1996 | Hartigan | 280/749 |
| 5,542,591 A | * 8/1996 | Moore et al. | 160/388 |
| 5,547,219 A | * 8/1996 | Ha | 180/274 |
| 5,690,382 A | 11/1997 | Cone | |
| 5,695,217 A | * 12/1997 | Ament et al. | 280/748 |
| 5,820,187 A | * 10/1998 | Ament et al. | 280/749 |
| 5,839,757 A | * 11/1998 | von Lange et al. | 280/749 |
| 5,857,701 A | 1/1999 | Nanda | |
| 5,876,064 A | * 3/1999 | Ament et al. | 280/749 |
| 5,879,048 A | * 3/1999 | Tower | 119/712 |
| 5,954,380 A | * 9/1999 | Ament et al. | 296/24.1 |
| 6,000,498 A | * 12/1999 | Rexroad et al. | 182/138 |
| 6,059,313 A | * 5/2000 | Coogan et al. | 280/749 |
| 6,135,497 A | * 10/2000 | Sutherland et al. | 280/748 |
| 6,183,028 B1 | 2/2001 | Ament et al. | |
| 6,302,463 B1 | * 10/2001 | Moore et al. | 296/24.1 |

FOREIGN PATENT DOCUMENTS

| | | | | |
|---|---|---|---|---|
| BE | 000642955 A1 | * 3/1995 | | 280/749 |
| JP | 404027629 A | * 1/1992 | | 296/24.1 |

* cited by examiner

*Primary Examiner*—Brian L. Johnson
*Assistant Examiner*—Kelly E Campbell
(74) *Attorney, Agent, or Firm*—Oltman, Flynn & Kubler

(57) ABSTRACT

An automotive safety net system having a front safety net and respective side safety nets, woven of man-made, synthetic, or natural fibers to prevent vehicle occupants from being thrust forward or sideways beyond the placement of the net in case of a sudden impact. The front safety net is attached to the interior of the vehicle frame transversely behind the front seats. The side safety nets are attached to respective ends of the front safety net and extend in a rearward direction attached to the interior of the vehicle frame adjacent the rear seat. The safety nets are attached to the interior of the vehicle frame using U-shaped mounting brackets having flared ends and adjustable length straps. The mounting brackets are low profile so as not to hinder ingress or egress, and the safety nets are easily detachable by releasing the straps at the respective mounting brackets.

6 Claims, 3 Drawing Sheets

AUTOMOTIVE SAFETY NET SYSTEM

BACKGROUND OF THE INVENTION

1. Field of Invention

The present invention relates to safety barriers for restraining movement of the occupants during rapid vehicle deceleration such as during accidents, and more particularly to safety barriers which include a safety net operatively connected to the vehicle frame to restrain the occupants.

2. Description of Related Art

Many different types of safety devices have been developed over the years to protect the occupants of motor vehicles. The most commonly known safety device is the conventional seat belt, which includes a lap belt and possibly an attached shoulder harness. Seat belts are now typically provided for the driver and all three or four passengers in the front and the rear seats of automobiles. More recently, air bags have also been used in automobiles in combination with seat belts initially designed to further protect the driver of the automobile. Some automobiles now also have an air bag for the front passenger, though deemed less effective than that for the driver because of the larger size of the air bag required due to the longer dashboard to passenger distance. Air bags for the rear passengers are difficult to provide since they would necessarily be mounted on the rears of the front seats, both an unstable mounting place and providing little knee room for the rear passengers.

While seat belts and air bags are good for most adults of average or larger size, they have proven dangerous in certain automobile accidents for smaller adults, children, and infants. For example, lap belts are designed to fit directly on the pelvis of an adult which prevents the internal organs from being crushed during a head-on accident. However, the lap belt fits above the pelvis on small adults and children, directly crushing the internal organs during such an accident. Likewise, the shoulder harness can cause neck injury to small adults and children due to the lower position of their necks relative to the shoulder harness. Air bags have similarly been known to cause injuries to small adults and children since such individuals may not be in the correct position during air bag firing or deployment. Being too close to the air bag during firing, or being laterally offset relative to the normal adult driving position causes the air bag to forcefully hit the person during deployment, rather than inflating first then acting as a cushion for the person's head to contact.

Infants present a particularly difficult problem due to their extremely small size. Child car seats which have a protective shell and cushioned interior present the best current solution. The shell typically attaches to the lap belt of the automobile for restraint of the shell, with an inner body harness which retains the infant to the cushion and shell. However, infants are still injured in such car seats when not properly installed, or if an air bag deploys in the seat to which the child car seat is attached.

Various devices other than seat belts, air bags, and child car seats have been devised. Some such devices use safety netting or nets which are movable from an out-of-the-way storage position to a deployed position to restrain typically one vehicle occupant. Others use safety nets which are fixed in a non-movable deployed or operative position.

Movable Safety Nets

In U.S. Pat. No. 5,547,219 issued to Ha is disclosed a crash net safety device for an automobile, which includes a U-shaped bar having a net fixed to the ceiling of the automobile and pivotally connected to the interior of the automobile at both sides. A trigger is operatively connected to one end of the U-shaped bar for allowing movement of the bar from a stowed position to a deployed position to protect an occupant upon the sensing of a collision by sensors in the automobile. Further, in U.S. Pat. No. 5,857,701 issued to Nanda is disclosed a protection system which includes a pair of expandable bellows which are normally in a retracted position. The bellows rapidly expand upon release of respective latches to deploy a crash barrier attached to the ceiling of the vehicle when a sensor detects an accident. Yet further, in U.S. Pat. No. 4,906,020 issued to Habrer is disclosed a passive restraining barrier which includes a restraining barrier bounded by first, second, and third restraining belts. The first and second restraining belts are fixed to the ceiling of the automobile, the third restraining belt connected to the bottom of the restraining barrier. First and second takeup belts are connected to the bottoms of the first two restraining belts, with first and second takeup belt retractors mounted to the body of the automobile. The takeup belts are received by the retractors and the restraining barrier is held by breakaway fasteners. When an accident occurs, the takeup belts are retracted into their retractors, bringing the restraining barrier to a deployed position in front of the driver or front passenger. Finally, in U.S. Pat. No. 5,226,672 is disclosed a protection system which includes a rectangular net stored in the ceiling of an automobile. The net is secured at four corners to cables that are guided along the interior of the automobile to a pair of pistons in cylinders located on the frame under the automobile. A sensor electrically triggers firing of charges that propel the pistons when an accident is detected. The pistons pull on the cables to deploy the net across the front and sides of the driver or passenger to restrain movement of any occupants in the seat.

Fixed Safety Nets

In U.S. Pat. No. 5,529,341 issued to Hartigan is disclosed a restraining net which includes a rectangular safety net which is affixed within a flexible support frame of upper, lower, and transverse straps. A pair of upper belts extend from the upper strap and are releasibly connected to the shoulder belts of a motor vehicle, being positioned above the seat back of the vehicle adjacent the ends of the seat. A pair of lower belts extend from the lower strap and are releasibly connected to the frame of the seat. Further, in U.S. Pat. No. 4,043,582 is disclosed a restraint device for protecting young children in the sleeping compartments or bunks of a recreational vehicle. The restraint device includes a safety net that is supported by a rectangular frame attached to the upper bunk so as to provide simultaneous vertical and horizontal support. Quick release snaps are provided to allow an adult ready access to the infant in the bunk. The quick release mechanism is such that an adult may have ready egress from the bunk, but a young child cannot release the mechanism. Yet further, in U.S. Pat. No. 4,213,636 is disclosed a barrier for separating the passenger compartment of a motor vehicle from the compartment occupied by the driver. The barrier includes a relatively stiff frame of plastic tubing which is expandable to allow for press fit installation in the particular motor vehicle. The frame is horizontally and vertically traversed by flexible bands which perform the barrier function. Finally, in U.S. Pat. No. 6,183,028 is disclosed a safety net device which includes a load-indicator which signals whether forces have acted on the safety net during an accident which might cause premature failure of the safety net. Deformation of respective anchoring members which retain the safety net to the motor vehicle is used to indicate forces were applied to the safety net possibly leading to premature failure of the safety net.

There is a need for a simple, cost effective fixed safety net system which is reliable, has no moving parts, can be designed to fit most motor vehicles, provides side impact protection if desired, which is easily removed and compactly stored when not needed, and which does not significantly obstruct the view of the occupants of the vehicle.

SUMMARY OF INVENTION

Advantages of the Invention

One of the advantages of the present invention is that it provides protection for minimizing forward and/or side movement of the occupants in the rear seating area of a moving motor vehicle upon sudden impact with an object.

A further advantage of the present invention is that it provides a safety net made of a webbed netting which is transparent enough so as to not significantly obstruct the view of the occupants, yet is sufficiently strong enough to prevent the occupants from hurtling forward or sideways beyond the netting.

Another advantage of the present invention is it provides a safety system which prevents and limits the occupants of the rear passenger area from being thrust forward and/or sideways beyond the immediate rear seating area.

Another advantage of the present invention is it does not involve any complicated mechanics or sensors that need to operate properly upon an impact and which are a function of the impact.

Another advantage of the present invention is the attachment of the mounting brackets to the interior framing ribs or posts of the motor vehicle far enough in front of the rear passenger area so as to not hinder leg and arm movements of the seated passengers.

Another advantage of the present invention is it can be mounted in easily detachable sections to the front and two sides of the rear passenger area.

Another advantage of the present invention is it provides flexibility allowing installing of the front safety net only, or by also installing one or both of the side safety nets.

Another advantage of the present invention is it utilizes straps that are easily detachable from the mounting brackets, but that can be made to permanently attach to the netting.

Another advantage of the present invention is it provides a safety net system that can be easily stored away when not in use, the permanently installed mounting brackets being small enough as to not interfere with the normal functions within the motor vehicle.

Another advantage of the present invention is it is equally suitable for young children and adults.

Another advantage of the present invention is it provides a safety net system which can be easily adapted for use in all types of motor vehicles including, but not limited to, cars, pick-up trucks, vans, busses, and even trains.

These and other advantages of the present invention may be realized by reference to the remaining portions of the specification, claims, and abstract.

BRIEF DESCRIPTION OF THE INVENTION

The invention comprises a safety net system for attachment to the interior structure of a motor vehicle to close a central opening disposed between a driver seating area in which at least one front seat is disposed and a rear passenger area of the motor vehicle. The safety net includes a front safety net, having opposing pairs of upper and lower edges and opposing pairs of end edges, said safety net being operable in a stretched state to close the central opening between the driver seating area and the passenger seating area.

The safety net further includes at least two front safety net anchoring assemblies which are affixable to the interior structure of the motor vehicle at the central opening. Each anchoring assembly is attachable to one opposing edge of the pairs of opposing edges of the front safety net to prevent occupants of the passenger seating area from being thrust forward through said front safety net into the driver seating area such as during sudden deceleration of the motor vehicle.

The safety net system can include at least one side safety net, preferably a pair of side safety nets and corresponding at least one side safety net anchoring assemblies. The side safety nets are operable in respective stretched states to close respective side openings disposed laterally adjacent the passenger seating area at respective side doors of the motor vehicle. Each of the at least one side safety net anchoring assemblies is affixable to the interior structure of the motor vehicle at the respective side opening, each being attachable to one opposing edge of said pairs of opposing edges to prevent occupants of the passenger seating area from being thrust sideways past the respective of the side safety nets out of the motor vehicle should the respective side door open during sudden lateral acceleration of the motor vehicle such as due to an impact.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Preferred embodiments of the present invention are shown in the accompanying drawings wherein.

DESCRIPTION OF THE PREFERRED EMBODIMENT

As seen in FIGS. 1–6, the present invention comprises an automotive safety net system, generally designated at 20, which is installed in a motor vehicle, such as an automobile 23. Safety net system 20 comprises a front safety net assembly 26 and a pair of respective side safety net assemblies 29.

Front Safety Net Assembly

Figure 5:
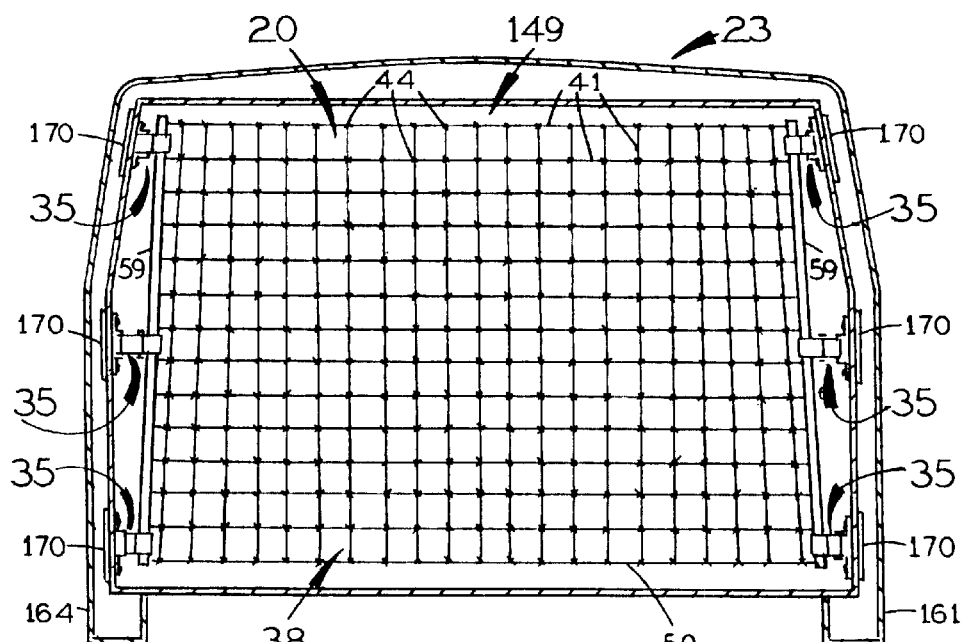
FIG. 5 is substantially a lateral vertical sectional view taken on the line 5—5 of FIG. 2.
Figure 6:
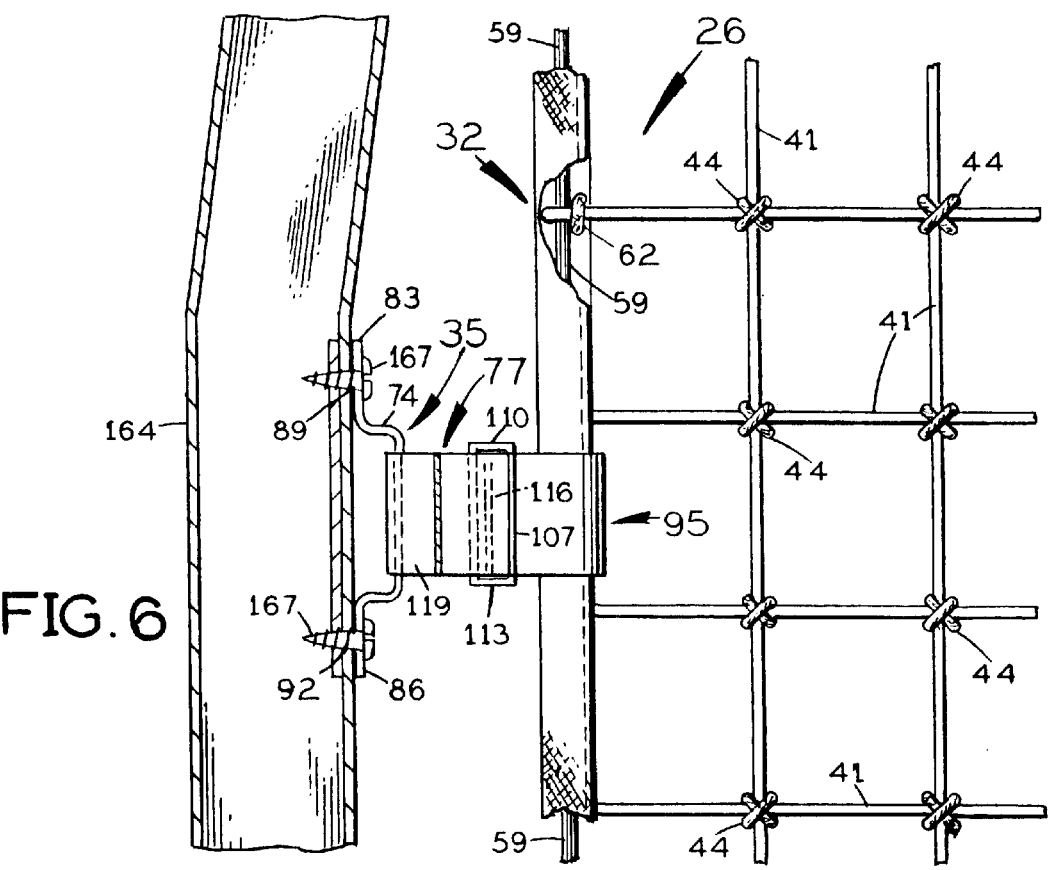
FIG. 6 is substantially a fragmentary view to an enlarged scale of a front safety net anchoring assembly connecting the front safety net to the interior of the frame of the automobile.

Referring to FIGS. 5 and 6, front safety net assembly 26 includes a front safety net 32 and a plurality of front safety net anchoring assemblies 35.

Front Safety Net: Front safety net 32 comprises a web or netting 38 made of a plurality of strands 41 made of natural or synthetic fiber which are interconnected at a plurality of center connections such as loops or knots 44. Front safety net 32 includes respective opposing upper and lower edges 47 and 50, and opposing end edges 53 and 56. A pair of metal stiffening rods 59 are affixed to the respective end edges 53 and 56 by looping around the respective strands 41 and securing at a plurality of end connections such as knots 62. Stiffening rods 59 along with the respective end edges 53 and 56 are contained within a respective fabric strip 65 wrapped around the respective end edge 53 and 56 with stiffening rod 59, and sewn at a respective seam 68 and 71.

Front Safety Net Anchoring Assemblies: Each front safety net anchoring assembly comprises a mounting bracket 74 and an adjustable strap assembly 77. Mounting bracket 74 is made from a steel rod which is bent and flattened to have a raised center band attachment portion 80 of round cross-section, and a pair of opposite flattened ends 83 and 86 having respective holes 89 and 92 therethrough. Adjustable strap assembly 77 comprises a woven web strap 95 and a buckle 98. Buckle 98 includes a unitary outer ring 101 having a pair of long legs 104 and 107 which are interconnected by a pair of short legs 110 and 113. A separate long center leg 116 is affixed to short legs 110 and 113 intermediate long legs 104 and 107 in a plane offset from that of outer ring 101. Long leg 104 is secured within a looped end 119 of strap 95 formed by a seam 122, opposite a straight end 125 thereof.

Mounting of Front Safety Net Assembly

Figure 4:
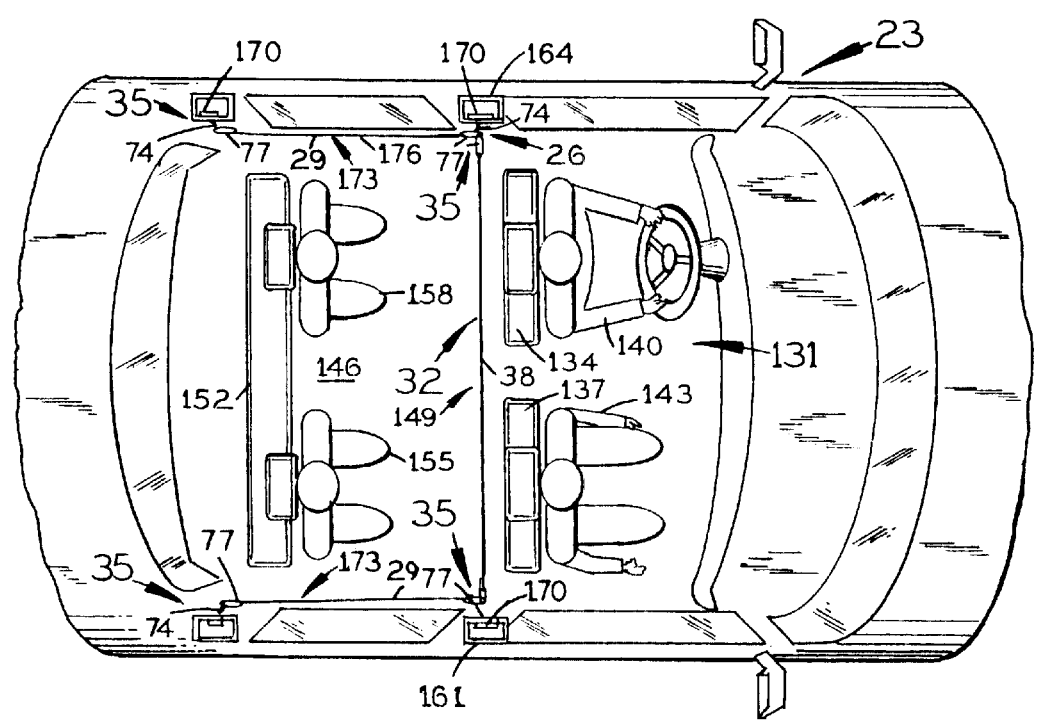
FIG. 4 is substantially a fragmentary top plan view of the automobile, the roof being removed to show the relative position of the vehicle occupants to the safety net system.

Automobile 23 includes an interior compartment 128 which includes a driver seating area 131 containing a drivers seat 134 and a front passenger seat 137 on which a driver 140 and a front passenger 143 are shown seated (FIG. 4). A passenger seating area 146 is disposed behind driver seating area 131, being separated therefrom by a central opening 149. Passenger seating area 146 includes a rear passenger seat 152 which extends across the width of interior compartment 128 for seating rear passengers 155 and 158.

Front safety net assembly 26 fits transversely within the interior compartment 128, being disposed in central opening 149 immediately behind drivers seat 134 and front passenger seat 137. Front safety net 26 is of such a size as to closely fit both vertically and laterally within the interior compartment 128 so as to prevent the passage therearound of passengers and other objects during an accident or other such sudden acceleration or deceleration of the automobile 23. Three of mounting brackets 74 mount to each of hollow right and left central roof support members 161 and 164 using respective pairs of bolts or screws, such as self-drilling sheet metal screws 167, which extend through the respective holes 89 and 92 of mounting brackets 74, and through the respective roof support members 161 and 164. A respective backing plate 170 can be disposed within the respective roof support members 161 and 164, into which screws 167 are driven to further secure brackets 74 to the respective roof support members 161 and 164. The front safety net 32 is connected to the respective mounting brackets 74 using the respective adjustable strap assemblies 77. The straight end 125 of each strap 95 is looped through the raised center band attachment portion 80 of the corresponding mounting bracket 74, and around one of end edges 53 and 56 adjacent the upper and lower edges 47 and 50 or centrally located therebetween with the respective stiffening rod 59 and fabric strip 65. Straight end 125 is then inserted under long leg 107, over long center leg 116, and under long leg 104 of buckle 98 and tensioned to secure front safety net in the desired position.

Side Safety Net Assemblies

Figure 1:
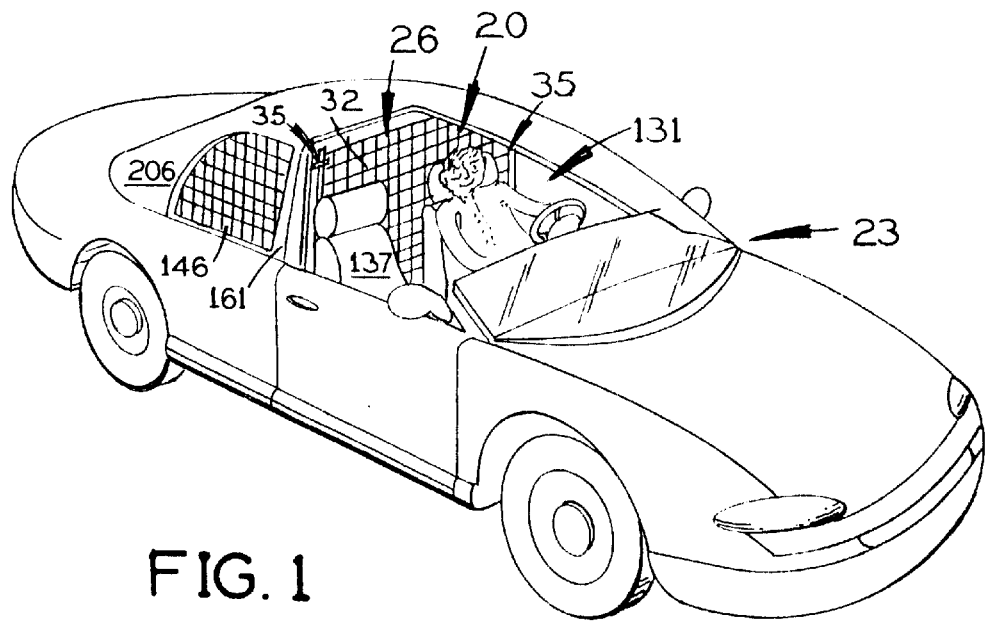
FIG. 1 is substantially a front quarter perspective view of an automobile, the roof being partially broken away to show the safety net system of the present invention as installed.
Figure 2:
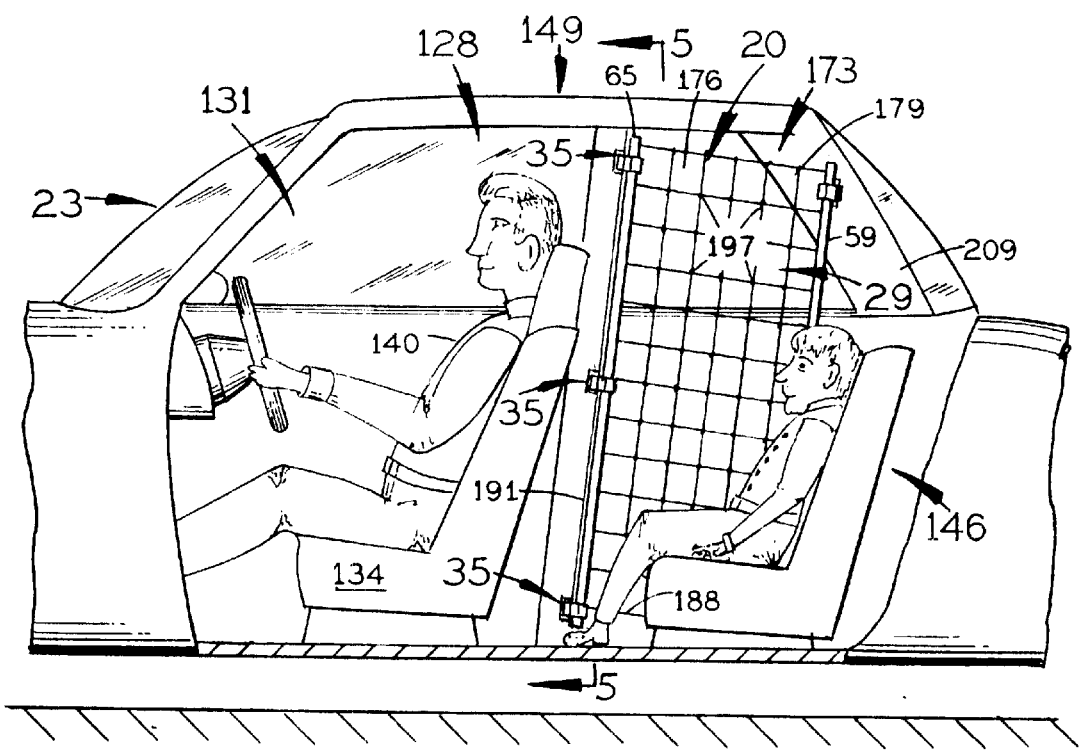
FIG. 2 is substantially a fragmentary side elevational view of the automobile, the doors and vehicle frame being partially broken away.
Figure 3:
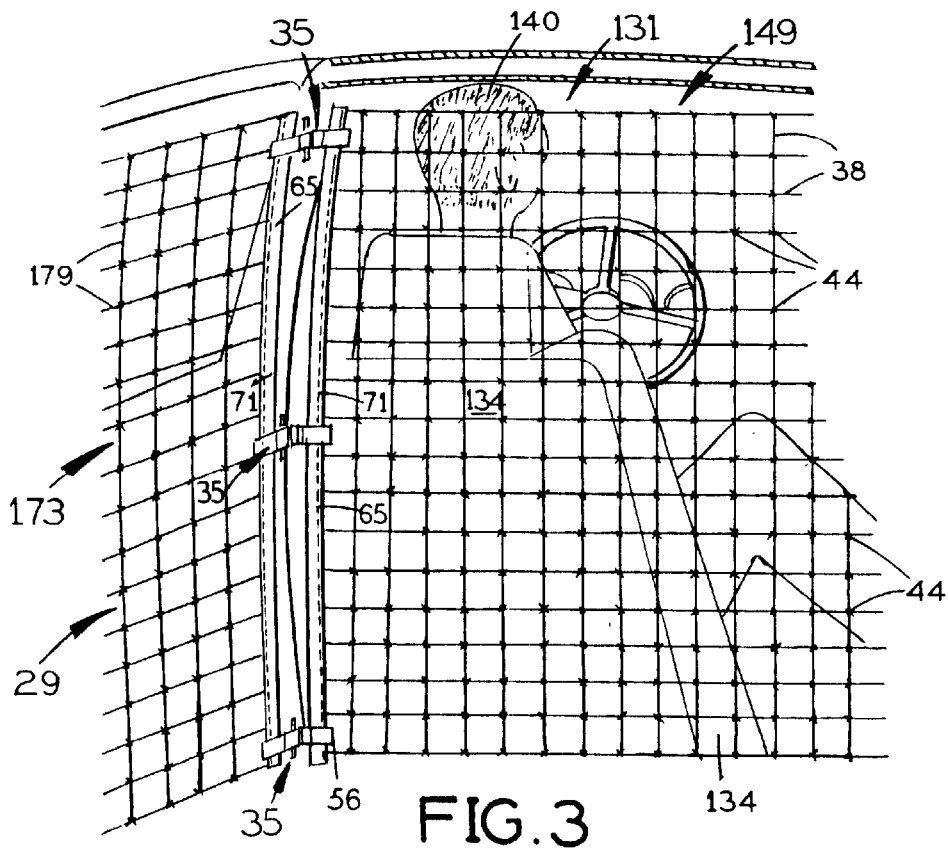
FIG. 3 is substantially a fragmentary rear perspective view of the safety net system showing the mounting to the vehicle side frame behind the drivers seat.

Referring to FIGS. 2–4, each side safety net assembly 29 includes a side safety net 173 and a plurality of the safety net anchoring assemblies 35.

Side Safety Net: Side safety net 173 comprises a web or netting 176 made of a plurality of strands 179 made of natural or synthetic fiber which are interconnected at a plurality of center connections such as loops or knots 182. Side safety net 173 includes respective opposing upper and lower edges 185 and 188, and opposing end edges 191 and 194. A pair of the metal stiffening rods 59 are affixed to the respective end edges 191 and 194 by looping around the respective strands 179 and securing at a plurality of end connections such as knots 197. Stiffening rods 59 along with the respective end edges 191 and 194 are contained within a respective fabric strip 65 wrapped around the respective end edge 191 and 194 with stiffening rod 59, and sewn at a respective seam 200 and 203.

Mounting of Side Safety Net Assemblies

Side safety net assemblies 29 each fit within the interior compartment 128, being longitudinally disposed, respectively, immediately behind drivers seat 134 and front passenger seat 137. Side safety net 173 is of such a size as to closely fit both vertically and laterally within the interior compartment 128 immediately behind drivers seat 134 and front passenger seat 137, and extending laterally adjacent rear passenger seat 152 so as to prevent the passage therearound of passengers and other objects during an accident or other such sudden acceleration or deceleration of the automobile 23. Three of the mounting brackets 74 mounted to the respective right and left center roof support members 161 and 164 using the same mounting brackets 74 used for front safety net 32. The other end edges 194 of netting 176 are each supported by three of mounting brackets 74 mounted to each of hollow right and left rear roof support members 206 and 209 using respective pairs of self-drilling sheet metal screws 167, which extend through the respective holes 89 and 92 of mounting brackets 74, and through the respective roof support members 206 and 209. A respective backing plate 170 can be disposed within the respective roof support members 206 and 209, into which screws 167 are driven to further secure brackets 74 to the respective roof support members 206 and 209. The side safety nets 173 are connected to the respective mounting brackets 74 using the respective adjustable strap assemblies 77. The straight end 125 of each strap 95 is looped through the raised center band attachment portion 80 of the corresponding mounting bracket 74, and around one of end edges 53 and 56 adjacent the upper and lower edges 47 and 50 or centrally located therebetween with the respective stiffening rod 59 and fabric strip 65. Straight end 125 is then inserted under long leg 107, over long center leg 116, and under long leg 104 of buckle 98 and tensioned to secure front safety net in the desired position.

CONCLUSION

It can now be seen that the present invention solves many of the problems associated with the prior art. The present invention provides protection for minimizing forward and/or side movement of the occupants in the rear seating area of a moving motor vehicle upon sudden impact with an object. The present invention provides a provides a webbed netting which is transparent enough so as to not significantly obstruct the view of the occupants, yet is sufficiently strong enough to prevent the occupants from hurtling forward or sideways beyond the netting. The present invention provides a safety system which prevents and limits the occupants of the rear passenger area from being thrust forward and/or sideways beyond the immediate seating area. The present invention provides a safety system which does not involve any complicated mechanics or sensors that need to operate properly and which are a function of the impact. The present invention provides a safety system in which the attachment of the mounting brackets to the interior framing ribs or posts far enough in front of the rear passenger area so as to not hinder leg and arm movements of seated passengers. The present invention provides a safety net system which can be mounted in easily detachable sections to the front and two sides of the rear passenger area. The present invention provides flexibility by installing the front safety net only, or by including either or both of the side safety nets. The present invention provides a safety net system which utilizes straps that are easily detachable from the mounting brackets, but that can be made to permanently attach to the netting. The present invention provides a safety net system that can be easily stored away when not intended for use, the mounting brackets being permanently installed in the motor vehicle but small enough as to not interfere with the normal functions within the vehicle. The present invention provides a safety net system which is useable equally for young children and adults. The present invention provides a safety net system which can be easily adapted for use to protect occupants of all types of motor vehicles including, but not limited to, cars, pick-up trucks, vans, busses, and even trains.

Although the description above contains many specifications, these should not be construed as limiting the scope of the invention but as merely providing illustrations of some of presently preferred embodiments of this invention. The specification, for instance, makes reference to straps with buckles for providing adjustable length. However, devices other than the type of buckle described, or other such devices which provide adjustment of the strap length are also contemplated. Likewise, straps can be replaced by belt-like ties, cables with end clips, or other such arrangements which do not provide for adjustable length, but which fit the particular motor vehicle. The specification makes reference to a specific design for the mounting brackets and straps. However, many different types of mounting brackets are possible which accommodate the straps, such as those made of sheet metal, fabricated from multiple component parts, or molded from plastic. Other attachment devices than straps are possible for use with the brackets, such as cables with end clips, and hook devices. Other materials can be used for the various component parts of the safety net device. The specification makes reference to certain metal parts. such as the mounting brackets and the stiffener rods. However, while the mounting brackets and stiffener rods are described as metal, they can be made of any suitable durable material such as appropriately selected plastics. The specification and drawings show the front safety net mounted to the frame of the vehicle immediately behind the drivers and front passenger seats with the side safety nets extending rearwardly therefrom. However, the front safety net and side safety nets can be positioned as desired to retain the vehicle occupants, including the driver and front passenger. The side safety nets can be connected to the respective door such as in a four door automobile to open outwardly with the door to facilitate exiting the vehicle, though such mounting of the side safety nets no longer protects the occupants from being ejected from the vehicle. It still, however, provides some cushioning from impacting the door during an accident. The specification makes reference to hardware comprising sheet metal screws to affix the mounting brackets to the interior frame of the vehicle. However, any suitable hardware can be used such as bolts, nuts, and washers, or even permanent affixing such as by welding. Also, while three mounting brackets are shown per end edge of the safety nets, other arrangements are possible such as a single bracket having multiple attachment points to the end edges or a single attachment along sub-satsantially the entire length of the end edge. Thus, the scope of the invention should be determined by the appended claims and their legal equivalents rather than by the examples given.

What is claimed is:

1. A safety net system for a motor vehicle having an interior structure comprising a floor in a driver and passenger seating area, a roof extending over the driver and passenger seating area, and substantially vertical roof supports on opposite sides of the vehicle between the driver and passenger seating areas supporting the roof from below; with a door opening on one side thereof extending behind said roof support at that side, said safety net system further comprising:

a front safety net;

a side safety net having opposing pairs of upper and lower edges and opposing pairs of front and rear end edges, said side safety net being operable in a stretched state to close said door opening;

an upper side safety net front anchoring assembly affixable to said roof support at said side of the vehicle adjacent the top of said door opening and attachable to said side safety net at said front end edge thereof, a lower side safety net front anchoring assembly affixable to said roof support adjacent the bottom of said door opening and attachable to said side safety net at said front end edge thereof, and an additional side safety net front anchoring assembly affixable to said roof support below said upper front anchoring assembly and above said lower front anchoring assembly and attachable to said side safety net at said front edge thereof;

and upper and lower side safety net rear anchoring assemblies affixable respectively to the interior structure of the motor vehicle behind said door opening adjacent the roof and the floor of the vehicle and attachable individually to said side safety net at said rear end edge thereof.

2. The safety net system of claim 1 a front safety net having anchoring assemblies wherein each of said front safety net anchoring assemblies comprises an anchoring bracket and a strap, each of said brackets having an elongate, bent member having a center loop portion and opposing end portions, said end portions being affixable to the corresponding roof support of the motor vehicle using hardware, said strap being attachable to said anchoring bracket by forming a loop in the strap between said center loop portion of the corresponding bracket and the corresponding roof support of the motor vehicle and around one respective end edge of the safety net, being affixed in said loop using a strap retainer.

3. The safety net of claim 2, wherein the hardware comprises a plurality of sheet metal screws which are insertable through respective clearance holes in the opposing end portions of the bent member of the corresponding bracket, and which are insertable through the corresponding roof support of the motor vehicle.

4. The safety net system of claim 2, wherein the strap is of adjustable length using the strap retainer to allow adjustment of strap length to stretch the safety net tightly across the central opening between the driver seating area and the passenger seating area.

5. A safety net system of claim 1, wherein said front safety net comprises: opposing pairs of upper and lower edges and opposing pairs of end edges, said safety net being operable in a stretched state to close the central opening between the driver seating area and the passenger seating area;

and two upper front safety net anchoring assemblies individually affixable respectively to said roof supports adjacent the top of the central opening on opposite sides thereof, each upper anchoring assembly being attachable to said front safety net at a corresponding end edge thereof, two lower front safety net anchoring assemblies individually affixable respectively to said roof supports adjacent the floor of the vehicle on opposite sides thereof, each lower anchoring assembly being attachable individually to said front safety net at a corresponding end edge thereof, and at least two additional front safety net anchoring assemblies individually affixable respectively to said roof supports on opposite sides of the central opening substantially below the corresponding upper front anchoring assemblies and above the corresponding lower front anchoring assemblies, each said additional anchoring assembly being attachable individually to a corresponding end edge of said front safety net substantially below said upper edge of the safety net to prevent occupants of the passenger seating area from being thrust forward through said front safety net into the driver seating area, such as during sudden deceleration of the motor vehicle.

6. A safety net system for a motor vehicle having an interior structure comprising a a floor in a driver and passenger seating area, a roof extending over the driver and passenger seating area, and substantially vertical roof supports on opposite sides of the vehicle between the driver and passenger seating areas supporting the roof from below; with a respective door opening on each side thereof extending behind said roof support at that side, said safety further comprising:

a front safety net;

a pair of side safety nets, each having opposing pairs of upper and lower edges and opposing pairs of front and rear end edges, each said side safety net being operable in a stretched state to close the corresponding door opening;

a respective upper side safety net front anchoring assembly affixable to the corresponding roof support at each side of the vehicle adjacent the top of the corresponding door opening and attachable to the corresponding side safety net at said front end edge thereof, a respective lower side safety net front anchoring assembly affixable to the corresponding roof support adjacent the bottom of each of said door openings and attachable to the corresponding side safety net at said front end edge thereof, and a respective additional side safety net front anchoring assembly affixable to the corresponding roof support below the corresponding upper front anchoring assembly and above the corresponding lower front anchoring assembly and attachable to the corresponding side safety net at said front edge thereof;

and upper and lower side safety net rear anchoring assemblies affixable respectively to the interior structure of the motor vehicle behind the respective door openings adjacent the roof and the floor of the vehicle and attachable individually to the corresponding side safety net at said rear end edge thereof.

\* \* \* \* \*